United States Patent
Kwon et al.

(10) Patent No.: US 12,278,805 B2
(45) Date of Patent: Apr. 15, 2025

(54) METHOD OF CONTROLLING SECURITY KEY OF VEHICLE

(71) Applicants: HYUNDAI MOTOR COMPANY, Seoul (KR); KIA CORPORATION, Seoul (KR)

(72) Inventors: Soon Myung Kwon, Suwon-si (KR); Aram Cho, Seoul (KR); Seong Cheol Park, Seongnam-si (KR); Taehwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 209 days.

(21) Appl. No.: 18/078,459

(22) Filed: Dec. 9, 2022

(65) Prior Publication Data
US 2023/0224284 A1   Jul. 13, 2023

(30) Foreign Application Priority Data
Jan. 11, 2022   (KR) .......................... 10-2022-0004202

(51) Int. Cl.
*H04L 29/06* (2006.01)
*H04L 9/40* (2022.01)

(52) U.S. Cl.
CPC .................. *H04L 63/0435* (2013.01)

(58) Field of Classification Search
None
See application file for complete search history.

(56) References Cited

U.S. PATENT DOCUMENTS

| | | | |
|---|---|---|---|
| 8,799,657 B2 * | 8/2014 | Bhattacharya | G07C 9/00174 380/259 |
| 10,355,868 B2 * | 7/2019 | Cho | H04L 9/3242 |
| 10,708,062 B2 * | 7/2020 | Hakuta | H04L 9/0869 |
| 2010/0191967 A1 * | 7/2010 | Fujii | H04L 63/0861 713/169 |
| 2015/0089236 A1 * | 3/2015 | Han | H04L 9/3271 713/168 |
| 2016/0255065 A1 * | 9/2016 | Oshida | H04L 69/324 726/3 |
| 2017/0142078 A1 * | 5/2017 | Lee | H04L 63/06 |
| 2019/0028448 A1 * | 1/2019 | Farrell | H04L 63/062 |
| 2021/0119800 A1 * | 4/2021 | Jung | H04L 9/3242 |
| 2021/0211271 A1 * | 7/2021 | Kuang | H04L 9/065 |

* cited by examiner

*Primary Examiner* — Maung T Lwin
(74) *Attorney, Agent, or Firm* — Morgan, Lewis & Bockius LLP

(57) ABSTRACT

A control method of a vehicle by a first controller and a second controller, the control method includes: generating, by the first controller, an Ea(B) in which a second symmetric key is encrypted based on a first symmetric key, and assigning a first random number to the Ea(B); receiving, by the second controller, the Ea(B) and the first random number, generating a fourth symmetric key in which the Ea(B) is decrypted based on a third symmetric key, and generating an Eb(N(MASTER)) in which the first random number is encrypted based on the fourth symmetric key; receiving, by the first controller, the Eb(N(MASTER)), and decrypting the Eb(N(MASTER)) to generate a second random number; and updating the second symmetric key based on a comparison between the first random number and the second random number.

18 Claims, 12 Drawing Sheets

FIG. 3
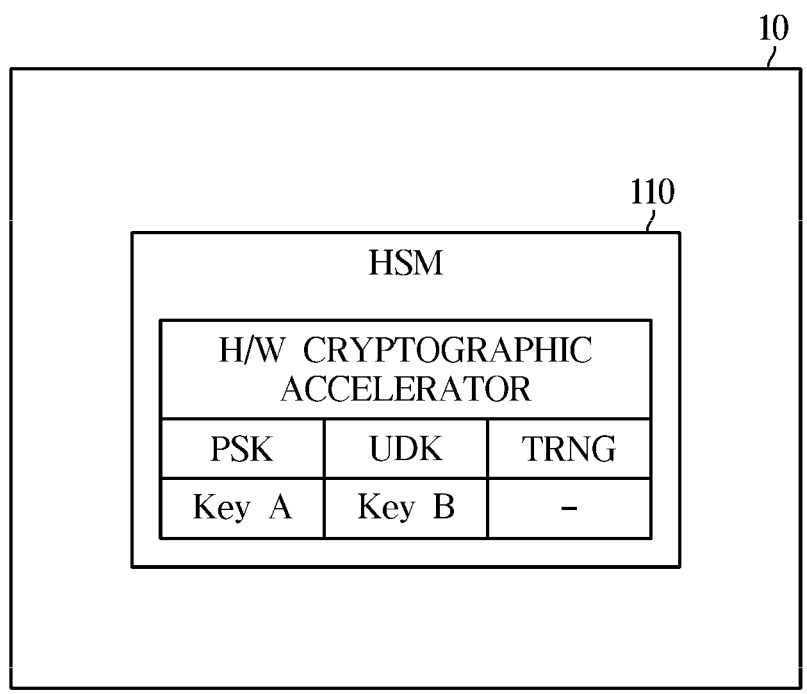
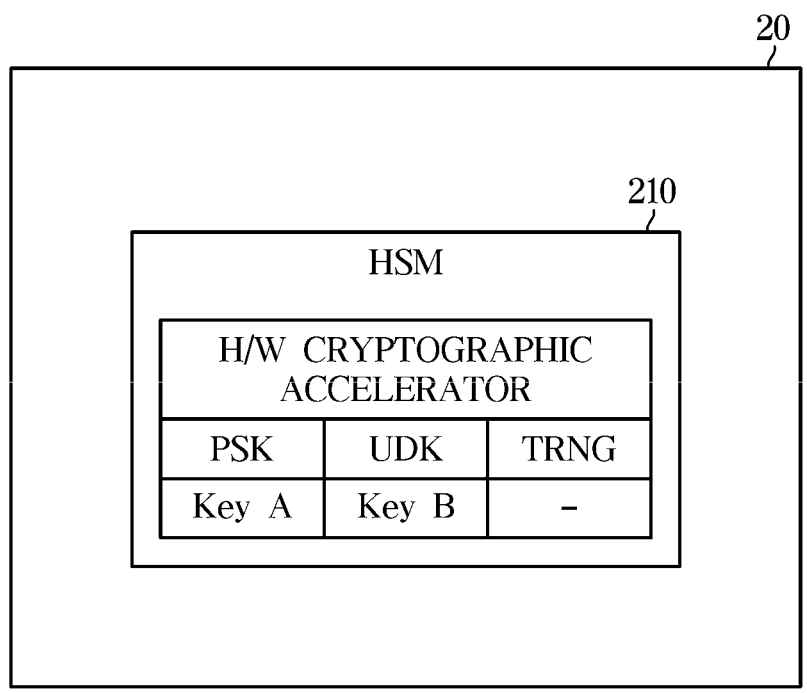

METHOD OF CONTROLLING SECURITY KEY OF VEHICLE

CROSS-REFERENCE TO RELATED APPLICATION

This application is based on and claims the benefit of priority to Korean Patent Application No. 10-2022-0004202, filed on Jan. 11, 2022 in the Korean Intellectual Property Office, the disclosure of which is incorporated herein by reference.

TECHNICAL FIELD

The disclosure relates to a method a control method of a vehicle, and more specifically, to a control method for updating a security key used for transmitting and receiving a message of a vehicle.

BACKGROUND ART

Vehicles recently produced are basically equipped with an electronic control unit (ECU) connected to communicate with internal devices, external devices and infrastructure, and are capable of accessing external devices over a wireless network.

As such, since a vehicle may be connected to a wireless communication and surrounding network environment, an ECU of the vehicle is also accessible by another vehicle through a network.

To prevent the above, an ECU of a vehicle may use an encryption key to maintain security of messages transmitted and received.

However, a likelihood of leakage of an encryption key may not be completely eliminated, and in the event of leakage of encryption key, various devices of vehicle may malfunction and important information may be exposed. In particular, when an autonomous vehicle is subject to hacking, a driver's life may be endangered as well as a risk of information leakage.

Accordingly, a separate means for protecting an encryption key is required to enhance security of vehicle.

SUMMARY

An aspect of the disclosure provides a control method of a vehicle that may prevent an encryption key used in a vehicle communication network from being leaked.

Additional aspects of the disclosure will be set forth in part in the description which follows and, in part, will be obvious from the description, or may be learned by practice of the disclosure.

According to an embodiment of the disclosure, there is provided a control method of a vehicle by a first controller and a second controller, the control method including: generating, by the first controller, an Ea(B) in which a second symmetric key is encrypted based on a first symmetric key, and assigning a first random number to the Ea(B); receiving, by the second controller, the Ea(B) and the first random number, generating a fourth symmetric key in which the Ea(B) is decrypted based on a third symmetric key, and generating an Eb(N(MASTER)) in which the first random number is encrypted based on the fourth symmetric key; receiving, by the first controller, the Eb(N(MASTER)), and decrypting the Eb(N(MASTER)) to generate a second random number; and updating the second symmetric key based on a comparison between the first random number and the second random number.

The first symmetric key is managed in a pre-shared key (PSK) field of the first controller, the second symmetric key is managed in a user-defined key (UDK) field of the first controller, the third symmetric key is managed in a PSK field of the second controller, and the fourth symmetric key is managed in a UDK field of the second controller.

The first symmetric key is the same as the third symmetric key and the second symmetric key corresponds to the fourth symmetric key.

The updating of the second symmetric key includes updating the second symmetric key with a fifth symmetric key, when the first random number is identical to the second random number.

The updating of the second symmetric key includes notifying an update failure, when the first random number and the second random number are different from each other.

The updating of the second symmetric key includes comparing the first random number and the second random number according to a predetermined number of times.

The updating of the second symmetric key includes notifying an update failure, when all the first random number and the second random number are different from each other as a result of the comparison.

The updating of the second symmetric key includes notifying an update failure, when at least one or more of the first random number and the second random number are different from each other as a result of the comparison.

The first symmetric key and the third symmetric key are the same key which is previously shared in an initial setting process of the first controller and the second controller.

The control method of the vehicle further includes updating the fifth symmetric key based on the first symmetric key and the fifth symmetric key.

According to an embodiment of the disclosure, there is provided a vehicle including: a first controller; and a second controller configured to be connected to the first controller via a controller area network (CAN) communication and transmit and receive data, wherein the first controller is configured to generate an Ea(B) in which a second symmetric key is encrypted based on a first symmetric key, and assign a first random number to the Ea(B), the second controller is configured to receive the Ea(B) and the first random number, generate a fourth symmetric key in which the Ea(B) is decrypted based on a third symmetric key, and generate an Eb(N(MASTER)) in which the first random number is encrypted based on the fourth symmetric key, and the first controller is configured to receive the Eb(N(MASTER)), decrypt the Eb(N(MASTER)) to generate a second random number, and update the second symmetric key based on a comparison between the first random number and the second random number.

The first symmetric key is managed in a PSK field of the first controller, the second symmetric key is managed in a UDK field of the first controller, the third symmetric key is managed in a PSK field of the second controller, and the fourth symmetric key is managed in a UDK field of the second controller.

The first symmetric key is the same as the third symmetric key and the second symmetric key corresponds to the fourth symmetric key.

The first controller is configured to update the second symmetric key with a fifth symmetric key, when the first random number is identical to the second random number.

The first controller is configured to notify an update failure, when the first random number and the second random number are different from each other.

The first controller is configured to compare the first random number and the second random number according to a predetermined number of times.

The first controller is configured to notify an update failure, when all the first random number and the second random number are different from each other as a result of the comparison.

The first controller is configured to notify an update failure, when at least one or more of the first random number and the second random number are different from each other as a result of the comparison.

The first symmetric key and the third symmetric key are the same key which is previously shared in an initial setting process of the first controller and the second controller.

The first controller is configured to update the fifth symmetric key based on the first symmetric key and the fifth symmetric key.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 illustrates a configuration of a hardware security module of a controller according to an embodiment;

DETAILED DESCRIPTION

Figure 1:
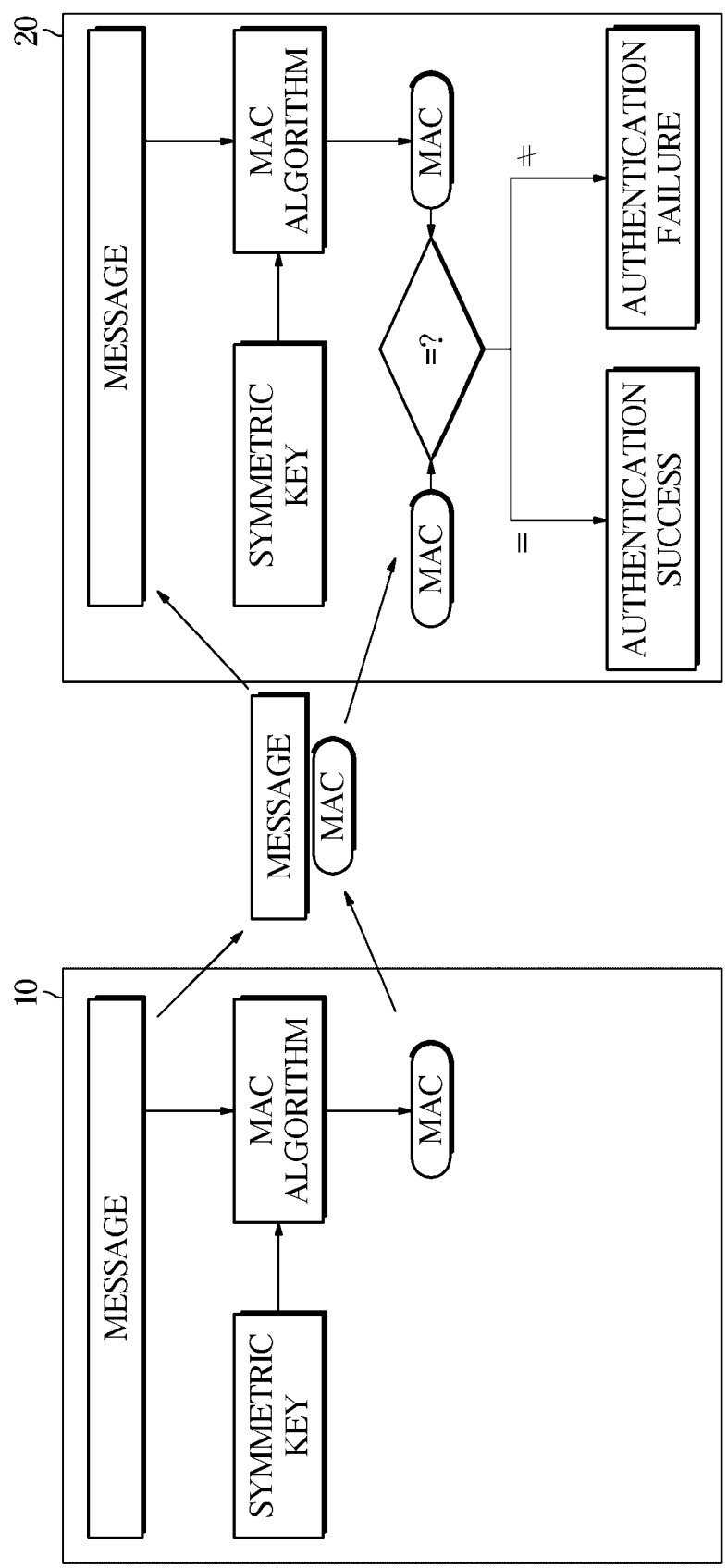
FIG. 1 is a basic conceptual diagram illustrating an authentication process using a message authentication code.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes connection via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 is a basic conceptual diagram illustrating an authentication process using a message authentication code.

The disclosure is applied to a vehicle requiring transmission and reception of message among controllers for autonomous driving, connectivity, and the like, and may maintain message security using a message authentication code (MAC). The MAC is a code attached to a message in order to verify whether the message, which is data, has been tampered (modified, deleted, inserted, etc.). The MAC checks whether the message has not been tampered, i.e., integrity of the message, from a sender, checks whether the sender is a stated controller, for an authentication of the message, and is performed based on a symmetric key which is a type of encryption key.

Referring to FIG. 1, a vehicle includes at least one of a first controller 10 and a second controller 20. When the first controller 10 is a transmission controller, the second controller 20 may be a reception controller, and when the second controller 20 is a transmission controller, the first controller 10 may be a reception controller. That is, the first controller 10 and the second controller 20 may have a master/slave relationship, and be connected through a controller area network (CAN) communication to transmit and receive data.

The first controller 10 and the second controller 20 may be implemented by hardware and software modules that are executed by a processor The processor according to an exemplary embodiment of the present disclosure may be a hardware device implemented by various electronic circuits (e.g., computer, microprocessor, CPU, ASIC, circuitry, logic circuits, etc.). The processor may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The first controller 10 and the second controller 20 share the same symmetric key with each other in advance so that an encryption algorithm may be implemented. A symmetric-key algorithm is an encryption algorithm that uses the same encryption key for both encryption and decryption.

The first controller 10, which is a sender, computes a MAC based on a message to be transmitted, and transmits the message and the computed MAC to the second controller 20.

The second controller 20 computes the MAC based on the received message, and compares the MAC, received from the first controller 10, with a MAC computed and obtained by the second controller 20 itself.

In this instance, when the two MACs are identical to each other, the second controller 20 determines that the message came from the first controller 10 (authentication success), and when the two MACs are different from each other, determines that the message did not come from the first controller 10 (authentication failure).

Meanwhile, when the symmetric key previously shared between the first controller 10 and the second controller 20 is leaked before comparing the MACs as described above, the second controller 20 recognizes the message from an external controller, which is not the first controller 10, and thus various devices receiving a control signal of the second controller 20 may malfunction. Accordingly, a pre-shared symmetric key is required to be periodically updated, and at the same time, the symmetric key is required to be synchronized between the first controller 10 and the second controller 20.

Figure 2:
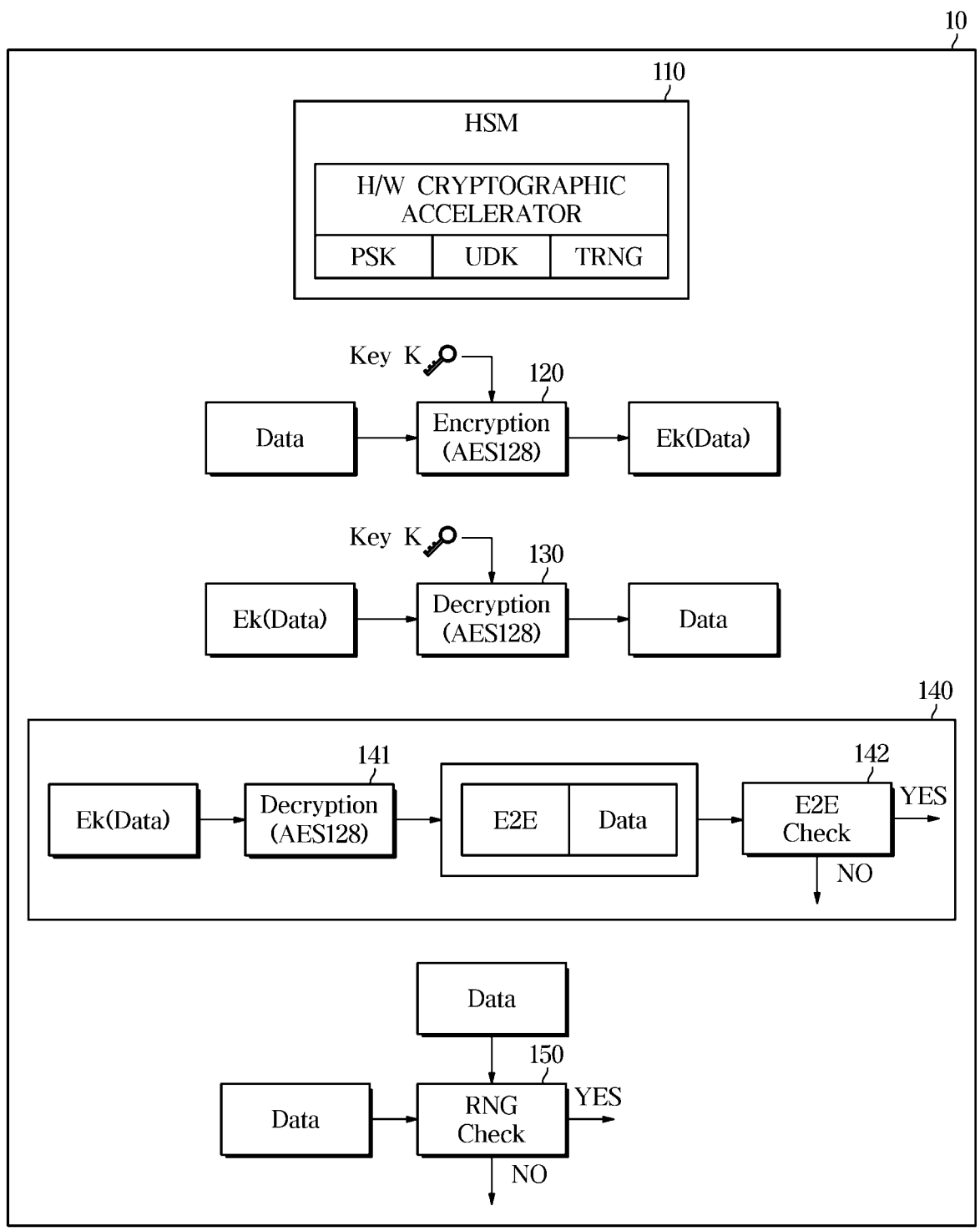
FIG. 2 illustrates a controller performing communication in a vehicle according to an embodiment.

FIG. 2 illustrates a controller performing communication in a vehicle according to an embodiment. FIG. 3 illustrates a configuration of a hardware security module of a controller according to an embodiment. In FIG. 2, although a description is made based on the first controller 10 for convenience of description, the description is also applicable to a configuration of the second controller 20 as well as any configuration in a master/slave relationship.

Referring to FIG. 2, the first controller 10 may be implemented with a hardware security module (HSM, 110), an Encryption 120, a Decryption 130, an E2E Protection 140 and a RNG Check 150, and each of the constituent components may be implemented by a separate hardware or a separate software logic, or implemented as an embedded system in an integrated form.

The HSM 110 is a device for generating and protecting an encryption key and is a computing device that performs encryption and decryption functions for authentication. The HSM 110 may be provided in a form of an external device or a plug-in card directly connected to a computing device or a network server, and be implemented with at least one processor (not shown). As a functional configuration, the HSM 110 may include a pre-shared key (PSK), a user-defined key (UDK), a true random number generator (TRNG), a H/W cryptographic accelerator.

The PSK is a key previously shared with each controller and is used to update a UDK which is applied to an actual communication message security. The PSK corresponds to a key shared between each of the controllers 10 and 20 by using some channels of the HSM 110 before being used. Unlike the PSK, the UDK is used for actual communication message security.

The TRNG is a random number generator used for key update, and is a device that generates random numbers through physical processing. Specifically, the TRNG consists of a transducer for converting a specific physical phenomenon to an electrical signal, and a specific type of analog-to-digital conversion circuit for converting an output into a digital number which is a binary digit 0 or 1. By repeatedly quantizing a random signal, a series of random numbers may be obtained.

The H/W cryptographic accelerator is a device that supports an advanced encryption standard (AES) security algorithm that stores a symmetric-key type cipher. In this instance, a length of key may be 128 bit, 192 bit, or 256 bit among the supported AES.

The Encryption 120 generates encrypted data by encrypting input data based on a key value, and the Decryption 130 generates data by decrypting the received encrypted data based on a key value.

When an operation is performed between the controllers, the E2E Protection 140 detects an error occurring during data transmission/reception. For example, during autonomous driving, when vehicle speed data or steering angle data is inaccurate, both a driver and a vehicle may be in danger. In this case, the E2E Protection may add an E2E Header (CRC, Counter) to data through an E2E Protect 141, and check integrity of the data by an E2E Header check with respect to the received data through an E2E Check 142.

The RNG Check 150 decrypts a random number transmitted by the controller and a received encrypted random number, and checks a consistency of key update through comparison check.

Meanwhile, referring to FIG. 3, the first controller 10 that manages a key value periodically changes the key value using a key update protocol for security of shared key value, and is synchronized with the second controller 20 which is a related controller. Hereinafter, an operation of updating a key value through the key update protocol is described in detail.

In an initial state for updating a key, a Key A is shared and managed in a PSK field of the HSM 110 of the first controller 10 and a PSK field of a HSM 210 of the second controller 20. Here, the Key A is used to update a Key B used for communication message security, and the Key B is managed in UDK fields of the HSMs 110 and 210. Hereinafter, operations of updating a key based on the first controller 10 and the second controller 20 are described in detail with reference to FIGS. 4 to 10.

Figure 4:
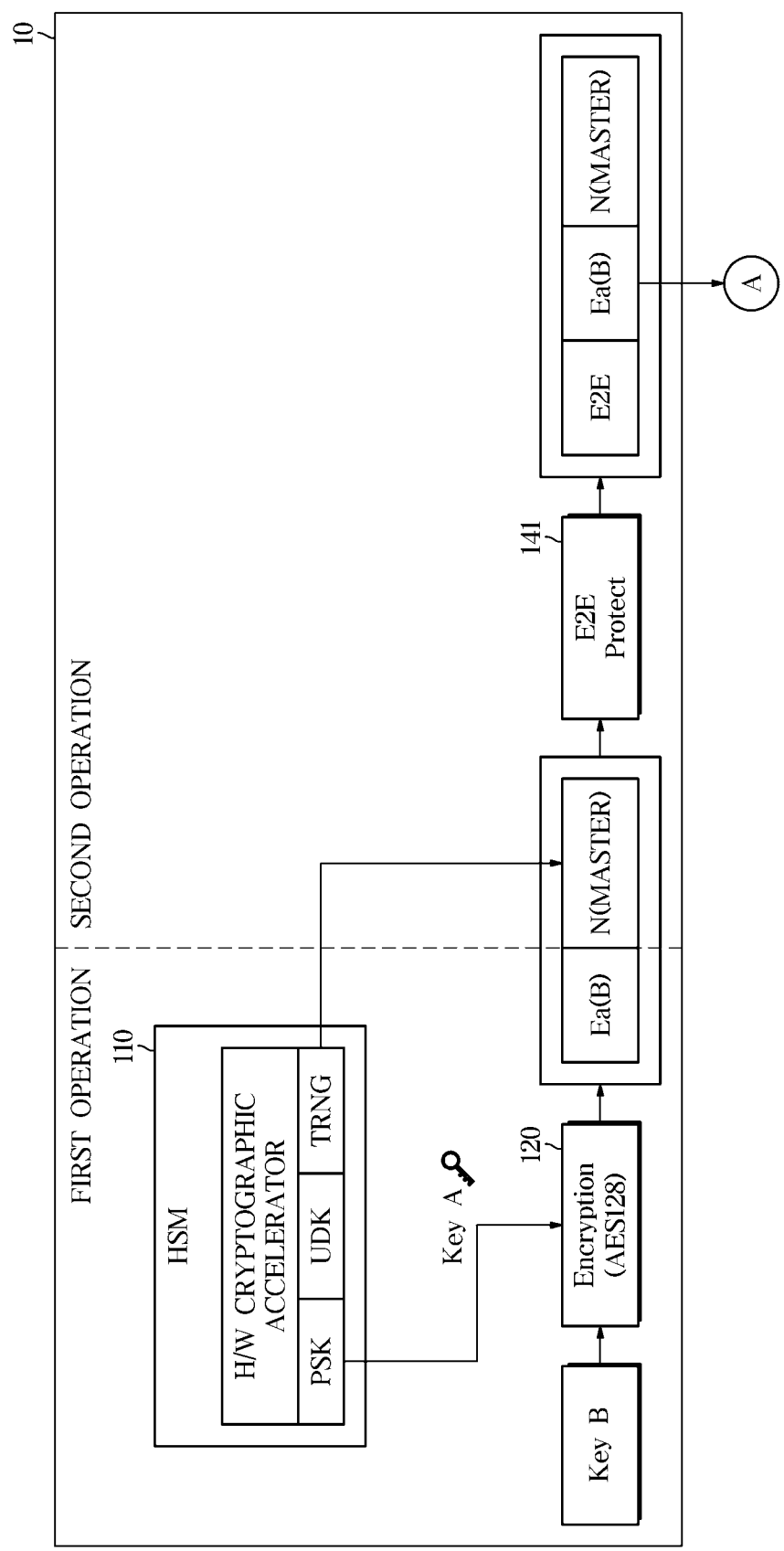
FIG. 4 is a signal flow graph of a master controller according to an embodiment.
Figure 5:
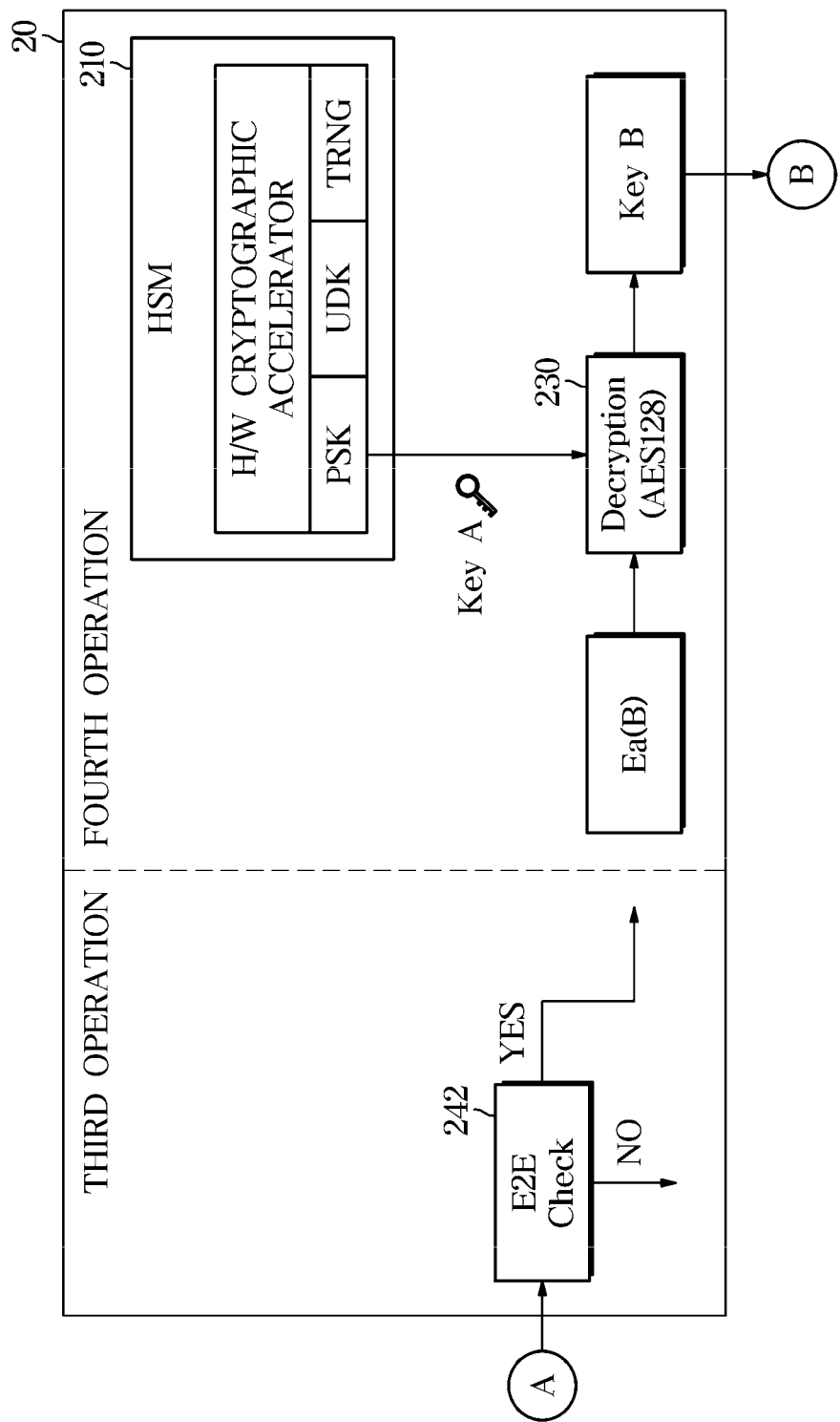
FIGS. 5 and 6 are signal flow graphs of a slave controller according to an embodiment.
Figure 6:
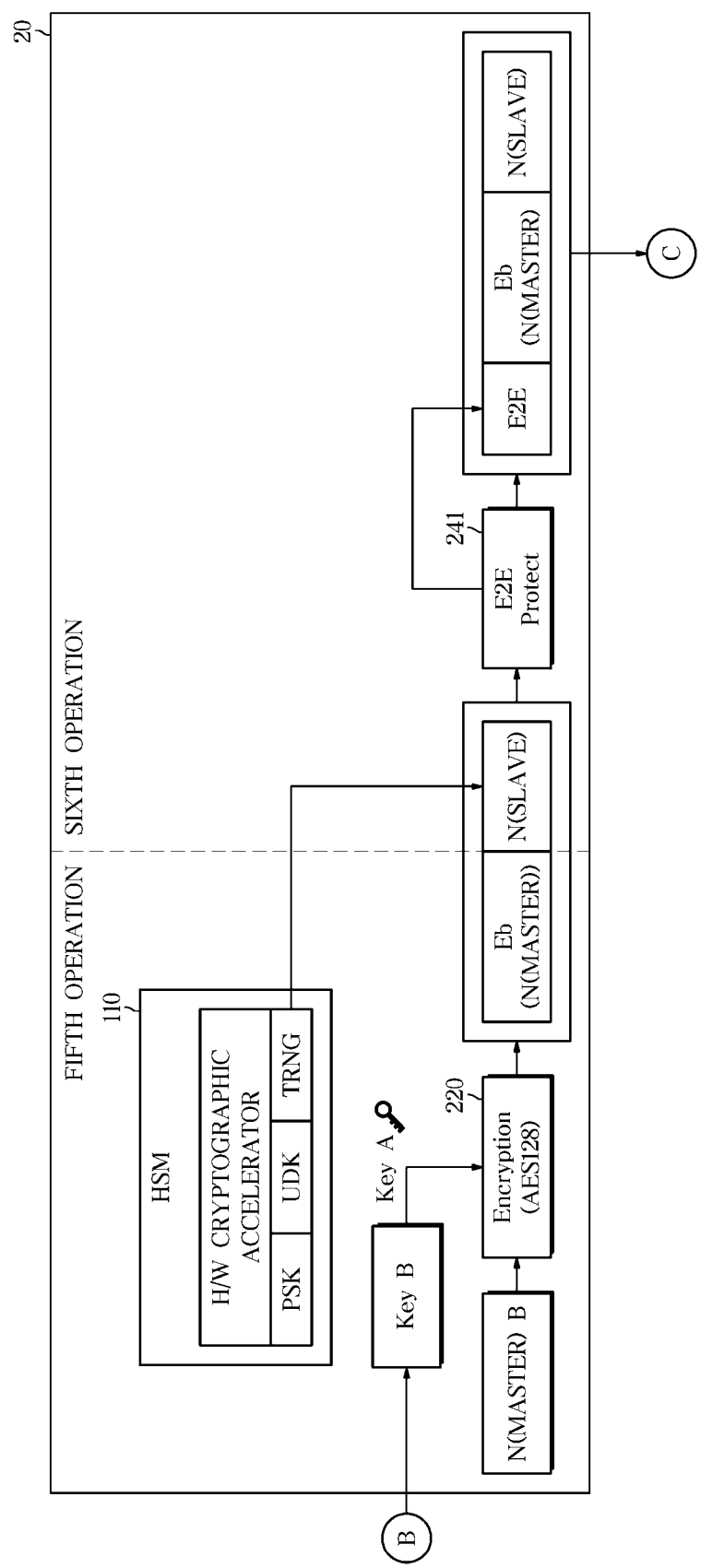
Figure 7:
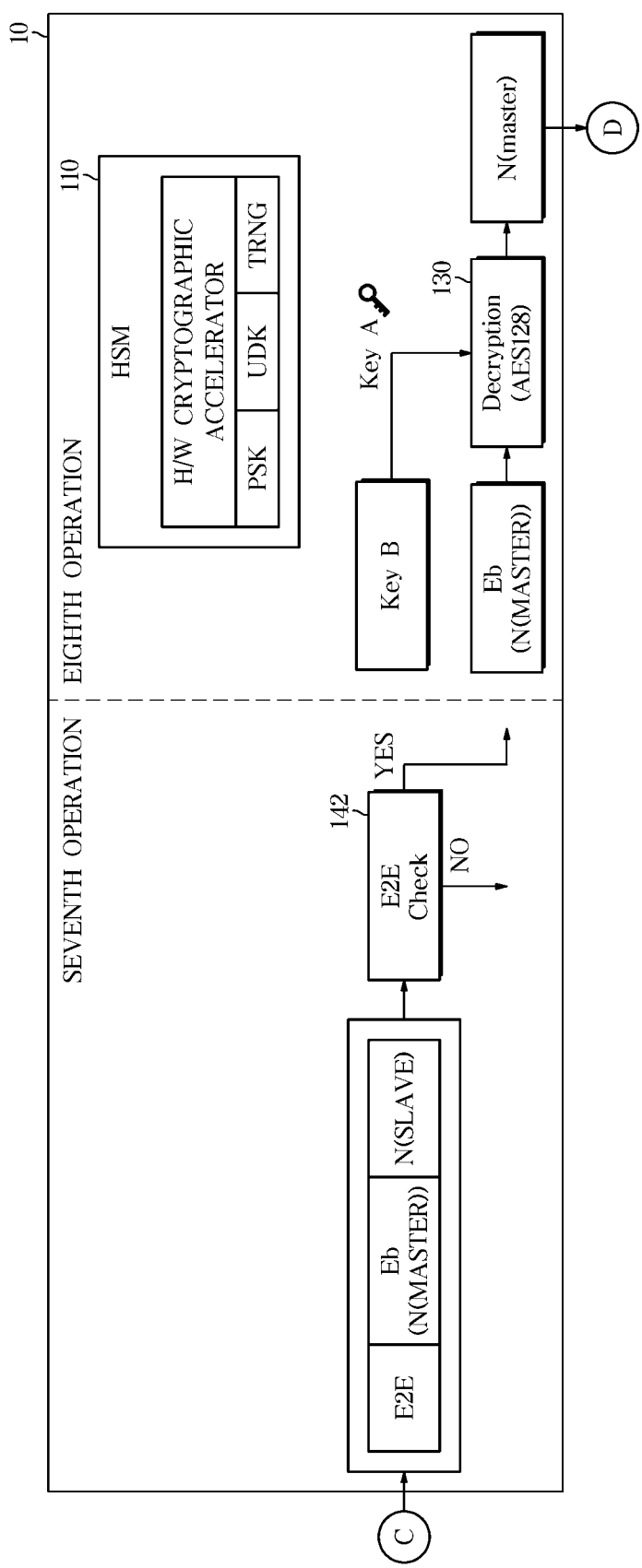
FIGS. 7 and 8 are signal flow graphs of a master controller according to an embodiment.
Figure 8:
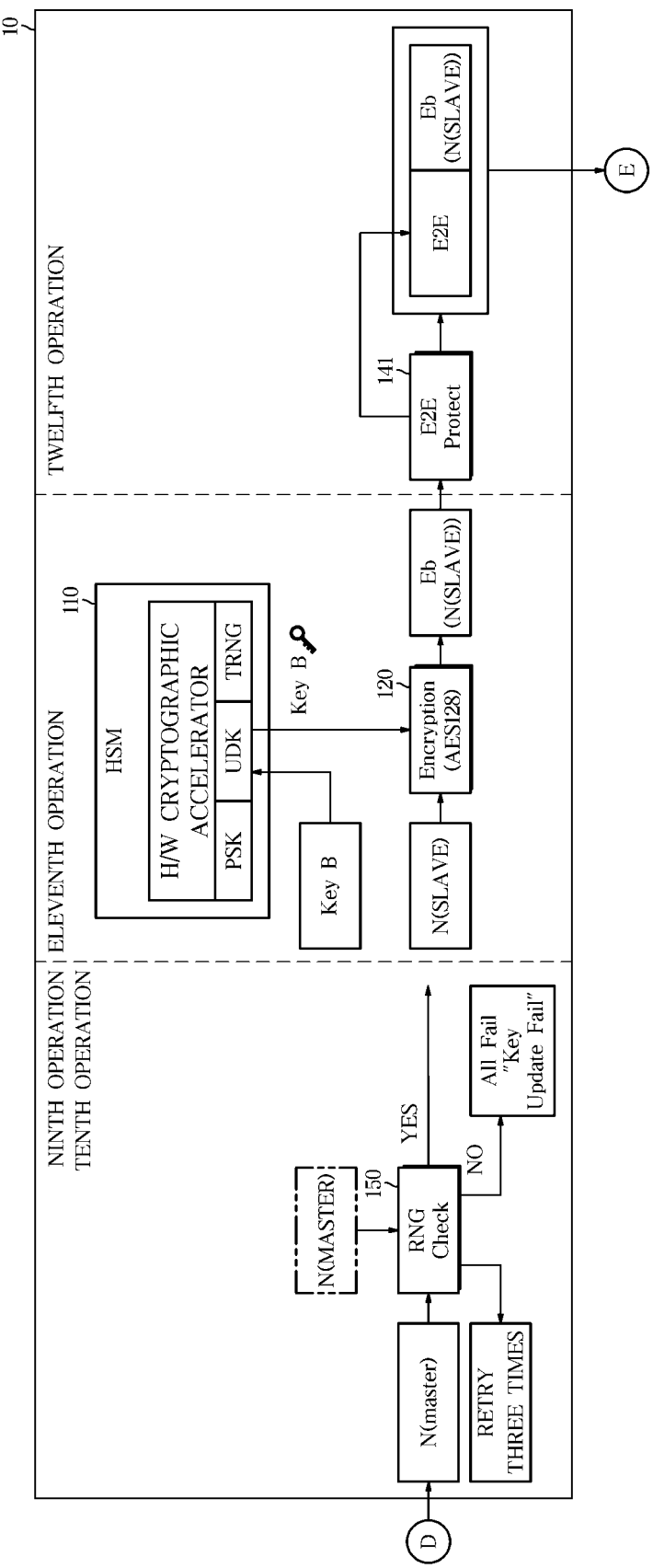
Figure 9:
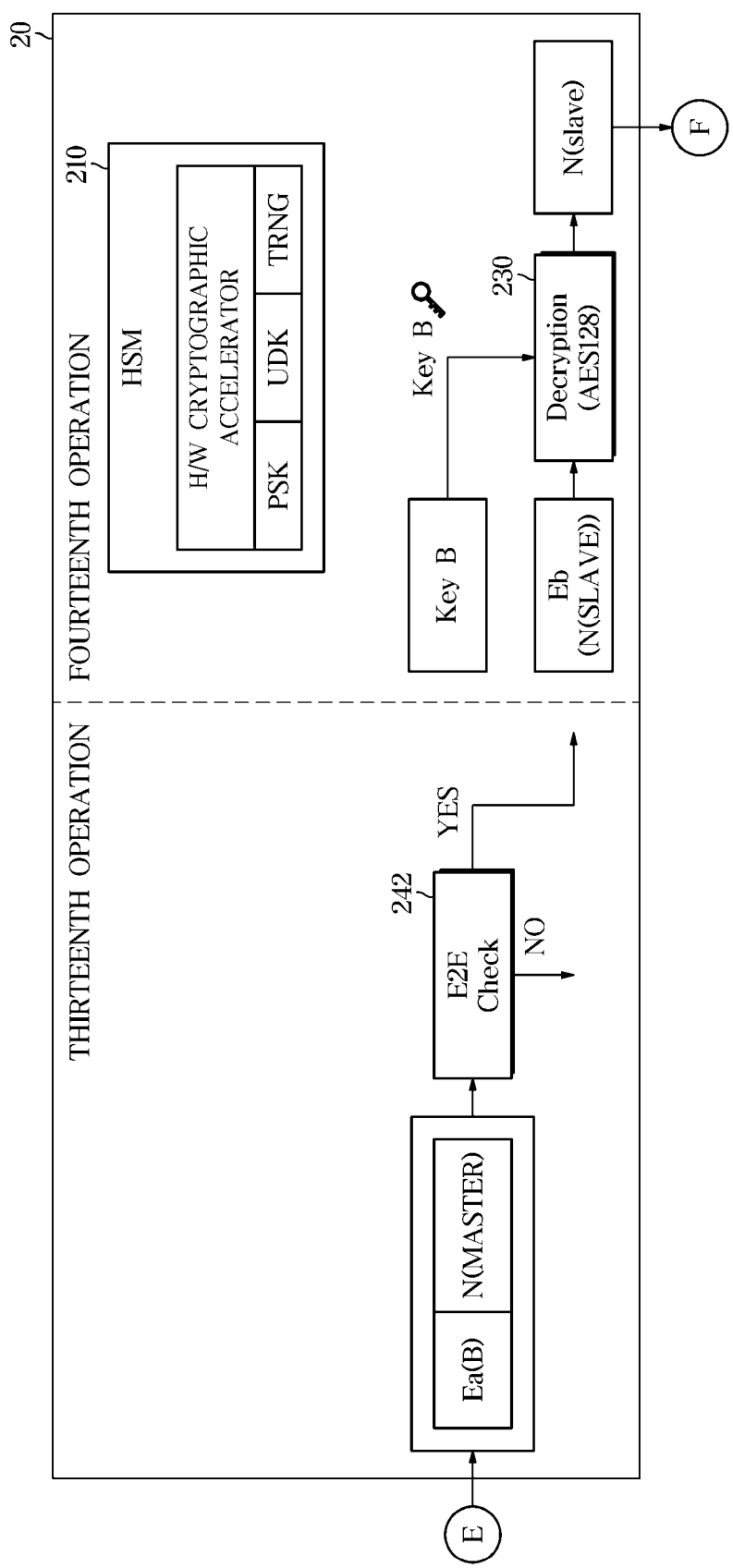
FIGS. 9 and 10 are signal flow graphs of a slave controller according to an embodiment.
Figure 10:
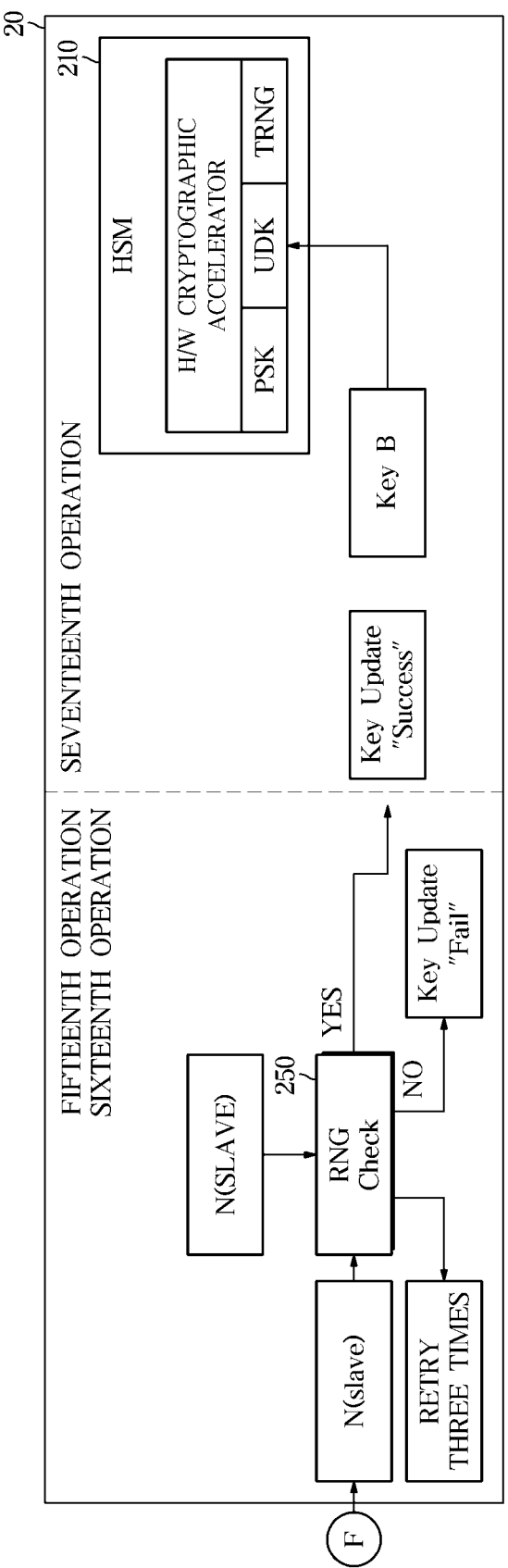

FIG. 4 is a signal flow graph of a master controller according to an embodiment. FIGS. 5 and 6 are signal flow graphs of a slave controller according to an embodiment. FIGS. 7 and 8 are signal flow graphs of a master controller according to an embodiment. FIGS. 9 and 10 are signal flow graphs of a slave controller according to an embodiment.

Referring to FIG. 4, the first controller 10 and the second controller 20 initiate a key change protocol, when a change of Key B is requested at a predetermined period or according to a user's setting. In this instance, the first controller 10 encrypts (120) the Key B using a Key A and generates an Ea(B) (1st operation). Here, the Key B is managed in an UDK field of the HSM 110 and is subject to updating.

The first controller 10 assigns an N(MASTER), which is a random number for cross check, to the Ea(B) generated in the first operation through a TRNG, and transmits to the second controller 20 through the E2E Protect (141) processing (2nd operation).

Referring to FIG. 5, the second controller 20 checks integrity of the data received from the first controller 10 through an E2E Check (242) (3rd operation). When the received data is erroneous or is received from an invalid controller which is not the first controller 10, the second controller 20 stops the key change protocol.

When the integrity of the received data is confirmed, the second controller 20 decrypts (230) the Ea(B) using the Key A and generates the Key B (4th operation). In this instance, referring to FIG. 6, the second controller 20 encrypts (220) the N(MASTER), which is the random number received from the first controller 10, using the decrypted Key B and the Key A, and generates an Eb(N(MASTER)) (5th operation). Also, the second controller 20 assigns an N(SLAVE), which is a random number for cross check, to the generated Eb(N(MASTER)) through the TRNG, and transmits to the first controller 10 through an E2E Protect (241) processing (6th operation).

Referring to FIG. 7, the first controller 10 receiving the data checks integrity of the data received from the second controller 20 through an E2E Check (142) (7th operation). When the received data is erroneous or is received from an invalid controller which is not the second controller 20, the first controller 10 stops the key change protocol.

When the integrity of the received data is confirmed, the first controller 10 decrypts (130) the Eb(N(MASTER)) using the Key B and generates N(master) (8th operation).

Referring to FIG. 8, the first controller 10 checks whether the N(MASTER) transmitted by the first controller 10 itself and the decrypted N(master) are identical to each other through an RNG Check (150) (9th operation).

The first controller 10 and the second controller 20 may perform the first operation to the ninth operation at least one time or more (10th operation). For example, when the first operation to the ninth operation are repeated three times and the first controller 10 and the second controller 20 start updating from a Key B0, the Key B0 may be updated with a Key B1, the Key B1 may be updated with a Key B2, and the Key B2 may be updated with a Key B3.

Although 'retry three times' is illustrated in FIG. 8, the first operation to the ninth operation may be performed only once or the Key B may be updated by changing the number of repetitions according to security settings. Also, the number of repetitions of RNG Check (150) may be increased according to an importance of security and a degree of risk occurring in an event of malfunction of a related controller.

When the transmitted random number N(MASTER) and the received decrypted random number N(master) are confirmed to be different from each other by the RNG Check (150), the first controller 10 notifies a key update failure and maintains the Key B which has been previously set. According to an embodiment, when the RNG Check (150) is repeatedly performed, the first controller 10 may notify an update failure in response to detecting a difference of the random numbers. Also, according to another embodiment, after repeatedly performing the RNG Check (150), when all the random numbers compared are different from each other or at least one or more of the random numbers compared are different from each other, the first controller 10 may notify an update failure.

When the transmitted random number N(MASTER) and the received decrypted random number N(master) are identical to each other, the first controller 10 updates the Key B to the UDK of the HSM 110, and generates an Eb(N(SLAVE)) in which the N(SLAVE), which is the random number received from the second controller 20, is encrypted (120) (11th operation). Also, after the E2E Protect (141) processing with respect to the generated Eb(N(SLAVE)), the first controller 10 transmits to the second controller 20 (12th operation).

Referring to FIG. 9, the second controller 20 checks integrity of the received data, Eb(N(SLAVE)), through the E2E Check (242) (13th operation). The second controller 20 decrypts (230) the Eb(N(SLAVE)), whose integrity has been confirmed, using the Key B, and generates an N(slave) (14th operation).

Referring to FIG. 10, the second controller 20 checks whether the N(SLAVE) transmitted by the second controller 20 itself and the decrypted N(slave) are identical to each other through an RNG Check (250) (15th operation). In this instance, when the transmitted random number N(SLAVE) and the received decrypted random number N(slave) are different from each other, the second controller 20 may perform the fifth operation to the fifteenth operation once or more (16th operation).

Although 'retry three times' is illustrated in FIG. 10, the fifth operation to the fifteenth operation may be performed only once or the number of repetitions may be changed according to security settings. In this instance, when a difference between the random numbers exists as a result of the RNG Check (250), the second controller 20 notifies an update failure. Also, the second controller 20 maintains the Key B which has been previously set.

When the number of times that the compared random numbers are the same is more than the predetermined number of times as a result of the RNG Check (250), the second controller 20 notifies a key update success and updates with a newly set Key B to the UDK field of the HSM 210.

That is, the new Key B may be updated in the UDK field of each of the first controller 10 and the second controller 20, and a control signal may be transmitted and received according to the new key.

Figure 11:
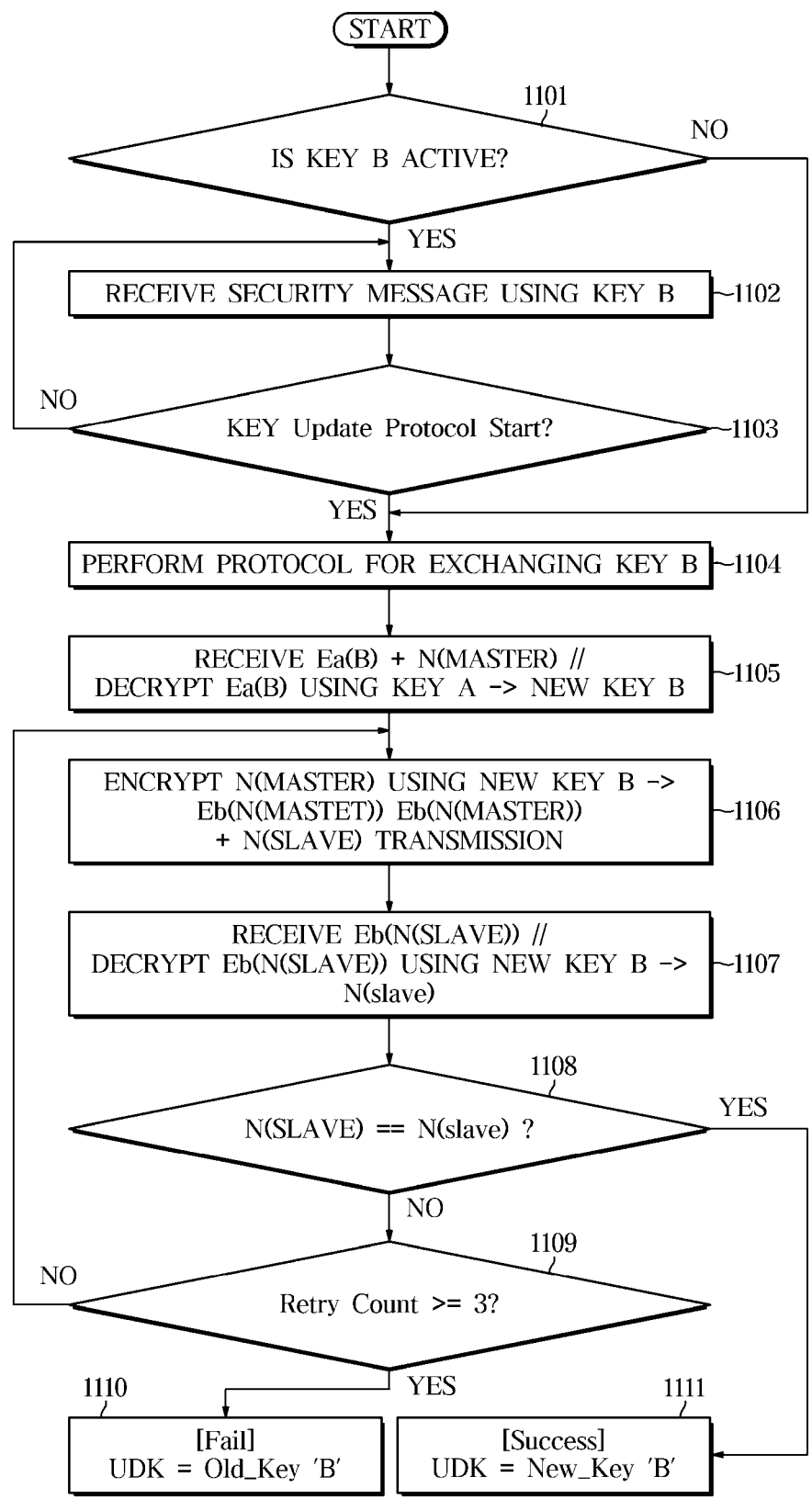
FIG. 11 is a flowchart illustrating operations of a slave controller according to an embodiment.
Figure 12:
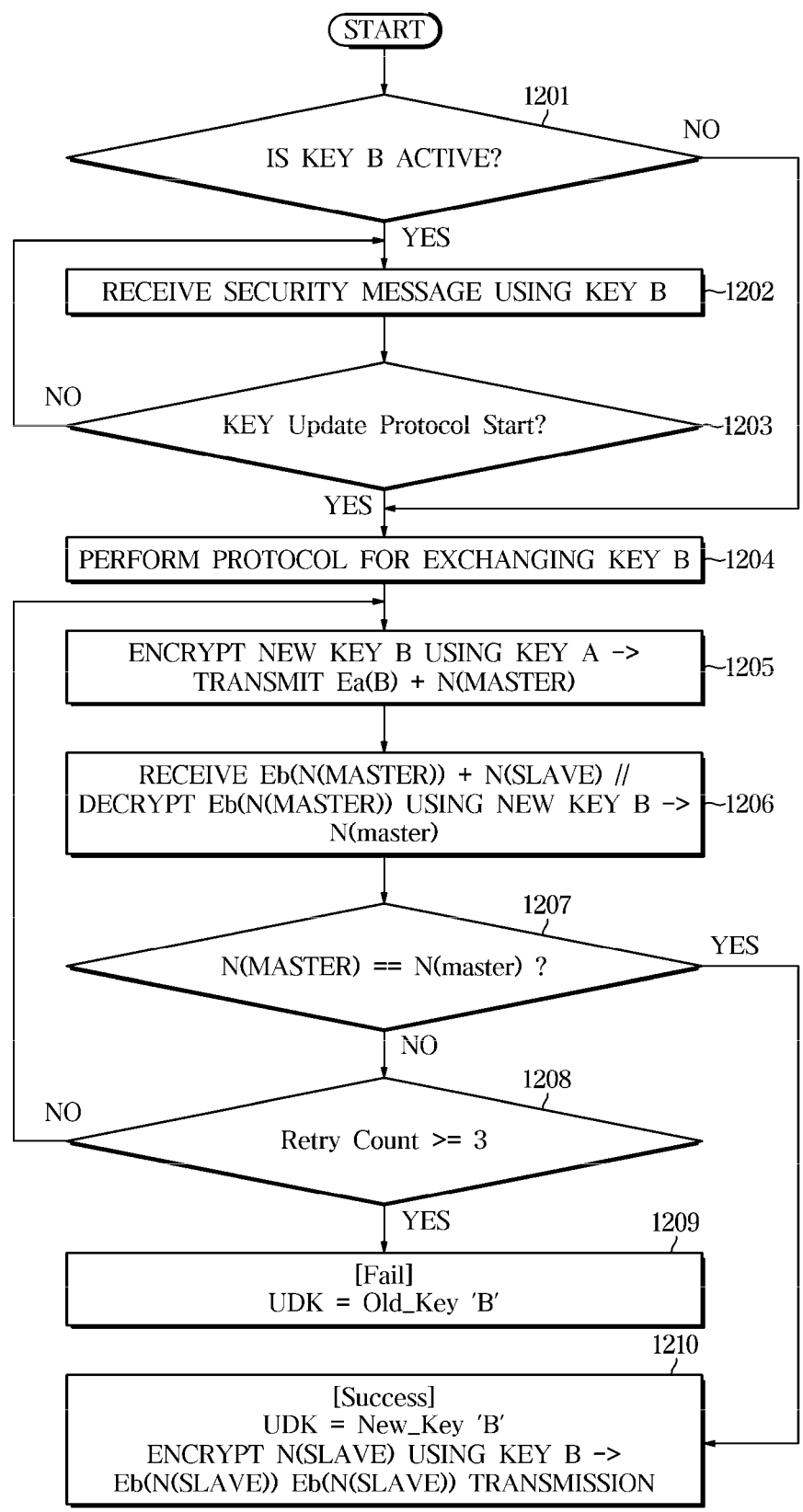
FIG. 12 is a flowchart illustrating operations of a master controller according to an embodiment.

FIG. 11 is a flowchart illustrating operations of a slave controller according to an embodiment. FIG. 12 is a flowchart illustrating operations of a master controller according to an embodiment. Although the slave controller and the master controller are described in FIGS. 11 and 12, respectively, a subject of operations are not limited thereto. The slave controller may perform the operations of FIG. 12, and the master controller may perform the operations of FIG. 11.

Referring to FIG. 11, when a Key B is active (1101), the second controller 20 receives a security message using the Key B (1102) and starts a key update protocol (1103) in response to receiving the security message.

When a protocol for exchanging the Key B is performed (1104), the second controller 20 receives an Ea(B) and an N(MASTER), and generates a New Key B (1105) by decrypting the Ea(B) using a Key A.

The second controller 20 generates an Eb(N(MASTER)) by encrypting the N(MASTER) based on the generated New Key B, assigns a N(SLAVE), which is a random number, to the Eb(N(MASTER)) and transmits to the first controller 10 (1106).

The second controller 20 receives an Eb(N(SLAVE)) from the first controller 10, and decrypts the Eb(N(SLAVE)) received from the first controller 10 based on the New Key B, thereby generating an N(slave) (1107).

The second controller 20 compares the self-generated N(SLAVE) and the N(slave) obtained from the first controller 10 (1108).

When the self-generated N(SLAVE) and the N(slave) obtained from the first controller 10 are the same, the second controller 20 completes updating by updating with a new key, New_Key B, to a UDK field (1111).

However, when the self-generated N(SLAVE) and the N(slave) obtained from the first controller 10 have different values, the second controller 20 retries comparison (1109) by decrypting the data obtained from the first controller 10 again. As a result of repeated comparison in operation 1109, when the number of times that a difference between the random numbers exists is more than the predetermined number of times, the second controller 20 notifies an update failure and maintains an existing key, Old_Key B, in the UDK field (1110). The number of repetitions of comparison is not limited to three times as shown in operation 1109, and may vary according to various settings.

Referring to FIG. 12, when a Key B is active (1201), the first controller 10 receives a security message using the Key B (1202) and starts a key update protocol (1203) in response to receiving the security message.

When a protocol for exchanging the Key B is performed (1204), the first controller 10 generates an Ea(B) by encrypting a New Key B based on a Key A, assigns a N(MASTER), which is a random number, to the Ea(B) and transmits to the second controller 20 (1205).

The first controller 10 receives an encrypted Eb(N(MASTER)) and N(SLAVE), and decrypts the Eb(N(MASTER)) based on the New Key B which has been newly updated in the second controller 20, thereby generating an N(master) (1206).

The first controller 10 compares the self-generated N(MASTER) and the N(master) obtained from the second controller 20 (1207).

When the self-generated N(MASTER) and the N(master) obtained from the second controller 20 are the same, the first controller 10 completes updating by updating with a new key, New_Key B, to a UDK field (1210).

When the self-generated N(MASTER) and the N(master) obtained from the second controller 20 have different values, the first controller 10 retries comparison (1208) by decrypting the data obtained from the second controller 20 again. As a result of repeated comparison in operation 1208, when the number of times that a difference between the random numbers exists is more than the predetermined number of times, the first controller 10 notifies an update failure and maintains an existing key, Old_Key B, in the UDK field (1209). The number of repetitions of comparison is not limited to three times as shown in operation 1208, and may vary according to various settings.

Meanwhile, as described above, the first controller 10 and the second controller 20 may update a symmetric key through random number comparison in a manner that encrypts a Key B based on a pre-shared Key A. Also, based on the above-described algorithm, a key update may be performed based on the updated Key B, not the pre-shared Key A.

Referring again to FIG. 3, the Key A is shared by the first controller 10 and the second controller 20 in the PSK field of the HSM 110. The Key A is used to update the Key B in the UDK field, and the Key B is used for message security.

For example, when a comparison result of random number is the same, the Key A in the UDK field may be updated to a Key A1. In the above embodiment, although a key in the UDK field is updated based on the initially shared Key A, update may be performed based on a last updated key.

According to an embodiment, after a symmetric key in the UDK field is updated, the first controller 10 and the second controller 20 may perform a key update protocol based on the updated symmetric key. In this case, even when a Key A is leaked, protection from external hacking is enabled by a new Key A. Also, according to an embodiment, the first controller 10 and the second controller 20 may initialize an update of the symmetric key in the UDK field. Accordingly, when the new Key A is hacked, protection from external hacking is enabled by the existing Key A by invalidating the update.

As is apparent from the above, according to the embodiments of the disclosure, the control method of a vehicle can automatically update an encryption key, thereby protecting in-vehicle information from hacking and preventing malfunctions during autonomous driving.

Embodiments can thus be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A control method of a vehicle by a first controller and a second controller, the control method comprising:
generating, by the first controller, an Ea(B) by encrypting a first message encryption key using a first symmetric key, and assigning a first random number to the Ea(B);
receiving, by the second controller, the Ea(B) and the first random number, generating a second message encryption key by decrypting the Ea(B) using a second symmetric key, and generating an Eb(N(MASTER)) by encrypting the first random number using the second message encryption key;
receiving, by the first controller, the Eb(N(MASTER)), and generating a second random number by decrypting the Eb(N(MASTER)) using the second symmetric key; and
updating, by the first controller, the first message encryption key when the first random number is the same of the second random number.

2. The control method of claim 1, wherein
the first symmetric key includes a pre-shared key (PSK) of the first controller, the first message encryption key includes a user-defined key (UDK)
the second symmetric key includes the PSK of the second controller and the second message encryption key includes the UDK of the second controller.

3. The control method of claim 2, wherein the updating, by the first controller, the first message encryption key comprises: updating the first message encryption key with a third message encryption key, when the first random number is identical to the second random number.

4. The control method of claim 3, further comprising:
updating, by the first controller, the third message encryption key based on the first symmetric key and the third message encryption symmetric key.

5. The control method of claim 2, wherein the updating, by the first controller, the first message encryption key comprises transmitting a message notifying an update failure to the second controller, when the first random number and the second random number are different from each other.

6. The control method of claim 2, further comprising:
comparing the first random number and the second random number.

7. The control method of claim 6, wherein the updating, by the first controller, the first message encryption key comprises transmitting a message notifying an update failure to the second controller, when all the first random number and the second random number are different from each other as a result of the comparison.

8. The control method of claim 6, wherein the updating of the first message encryption key comprises transmitting a message notifying an update failure to the second controller, when at least one or more of the first random number and the second random number are different from each other as a result of the comparison.

9. The control method of claim 1, wherein the first symmetric key and the second symmetric key are the same key which is previously shared in an initial setting process of the first controller and the second controller.

10. A vehicle, comprising:
a first controller; and
a second controller configured to be connected to the first controller via a controller area network (CAN) communication and transmit and receive data,
wherein the first controller is configured to generate an Ea(B) by encrypting a first message encryption key using a first symmetric key, and assign a first random number to the Ea(B),
the second controller is configured to receive the Ea(B) and the first random number, generate a second message encryption key by decrypting the Ea(B) using a second symmetric key, and generate an Eb(N(MASTER)) by encrypting the first random number using the second message encryption key, and
the first controller is configured to receive the Eb(N(MASTER)), generate a second random number by decrypting the Eb(N(MASTER)) using the second symmetric key, and update the first message encryption key when the first random number is the same of the second random number.

11. The vehicle of claim 10, wherein
the first symmetric key includes a pre-shared key (PSK) of the first controller, the first message encryption key includes a user-defined key (UDK) of the first controller,
the second symmetric key includes a PSK of the second controller and the second message encryption key includes a UDK of the second controller.

12. The vehicle of claim 11, wherein the first controller is configured to update the first message encryption key with a third message encryption key, when the first random number is identical to the second random number.

13. The vehicle of claim 12, wherein the first controller is configured to update the third message encryption key based on the first symmetric key and the third message encryption key.

14. The vehicle of claim 11, wherein the first controller is configured to transmit a message notifying an update failure to the second controller, when the first random number and the second random number are different from each other.

15. The vehicle of claim 11, wherein the first controller is configured to compare the first random number and the second random number.

16. The vehicle of claim 15, wherein the first controller is configured to transmit a message notifying an update failure to the second controller, when all the first random number and the second random number are different from each other as a result of the comparison.

17. The vehicle of claim 15, wherein the first controller is configured to transmit a message notifying an update failure to the second controller, when at least one or more of the first random number and the second random number are different from each other as a result of the comparison.

18. The vehicle of claim 10, wherein the first symmetric key and the second symmetric key are the same key which is previously shared in an initial setting process of the first controller and the second controller.

* * * * *